(12) United States Patent
Sadamitsu et al.

(10) Patent No.: US 8,389,124 B2
(45) Date of Patent: Mar. 5, 2013

(54) AZO COMPOUND AND DYE POLARIZING FILM CONTAINING THE SAME

(75) Inventors: Yuichi Sadamitsu, Tokyo (JP); Hiroaki Ohno, Tokyo (JP); Takahiro Higeta, Tokyo (JP)

(73) Assignees: Nippon Kayaku Kabushiki Kaisha, Tokyo (JP); Polatechno Co., Ltd., Niigata (JP)

( * ) Notice: Subject to any disclaimer, the term of this patent is extended or adjusted under 35 U.S.C. 154(b) by 0 days.

(21) Appl. No.: 13/181,743

(22) Filed: Jul. 13, 2011

(65) Prior Publication Data

US 2011/0267691 A1 Nov. 3, 2011

Related U.S. Application Data

(62) Division of application No. 12/227,994, filed as application No. PCT/JP2007/061813 on Jun. 12, 2007.

(30) Foreign Application Priority Data

Jun. 13, 2006 (JP) ................... 2006-162990

(51) Int. Cl.
*B32B 27/30* (2006.01)
*C09B 33/18* (2006.01)
*G02B 5/30* (2006.01)
*G02C 7/12* (2006.01)

(52) U.S. Cl. ................. 428/500; 359/487.02; 534/731; 534/796; 252/585

(58) Field of Classification Search .................. None
See application file for complete search history.

(56) References Cited

U.S. PATENT DOCUMENTS

| | | | |
|---|---|---|---|
| 4,556,707 | A | 12/1985 | Henk |
| 7,931,702 | B2 | 4/2011 | Sadamitsu et al. |
| 8,232,375 | B2 | 7/2012 | Higeta et al. |
| 2004/0232394 | A1 | 11/2004 | Khan et al. |
| 2005/0003109 | A1* | 1/2005 | Oiso et al. .................... 428/1.3 |
| 2010/0226008 | A1 | 9/2010 | Higeta et al. |
| 2011/0060134 | A1 | 3/2011 | Sadamitsu et al. |
| 2011/0063546 | A1 | 3/2011 | Sadamitsu et al. |
| 2011/0075076 | A1 | 3/2011 | Nishiguchi et al. |
| 2011/0089383 | A1 | 4/2011 | Sadamitsu et al. |
| 2011/0164208 | A1 | 7/2011 | Nishiguchi et al. |

FOREIGN PATENT DOCUMENTS

| | | |
|---|---|---|
| EP | 1614719 A1 * | 1/2006 |
| FR | 1541972 A * | 10/1967 |

OTHER PUBLICATIONS

Farbenfabriken Bayer; Colorants Disazoiques, Oct. 26, 1967 equivalent to FR1541972.*
Office Action dated Aug. 11, 2011 in corresponding U.S. Appl. No. 121227,994.
Notice of Allowance mailed Jun. 4, 2012 in co-pending U.S. Appl. No. 12/739,210.
Final Rejection mailed Feb. 9, 2012 in corresponding U.S. Appl. No. 12/227,994.
Japanese Communication with English translation, issued Apr. 27, 2012 and mailed May 8, 2012, in co-pending Japanese Patent Application No. JP 2008-517886.
Notice of Allowance mailed Nov. 16, 2012 in corresponding U.S. Appl. No. 12/227,994.
Office Action mailed Dec. 6, 2012 in co-pending U.S. Appl. No. 12/993,643.
Office Action mailed Dec. 12, 2012 in co-pending U.S. Appl. No. 12/999,447.

* cited by examiner

*Primary Examiner* — Angela Ortiz
*Assistant Examiner* — Chinessa Adkins
(74) *Attorney, Agent, or Firm* — Nields, Lemack & Frame, LLC

(57) ABSTRACT

Disclosed is an azo compound represented by the formula (1) or (2) below, or a salt thereof.

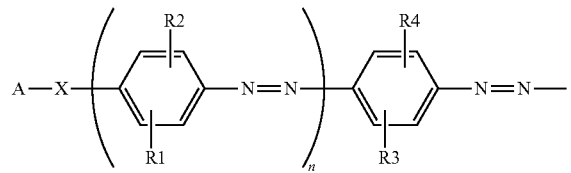

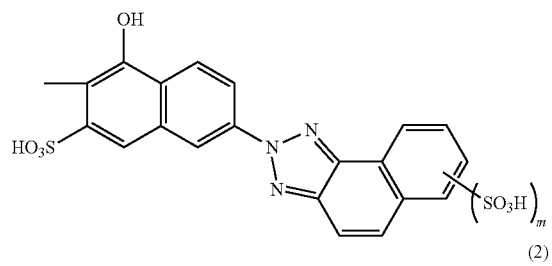

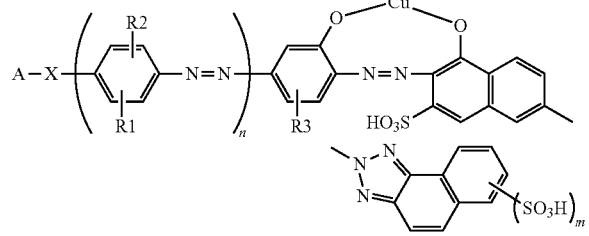

(In the formulae, A represents a substituted phenyl group or a naphthyl group having 1-3 sulfonic acid groups; X represents —N=N— or —NHCO—; $R^1$-$R^4$ independently represent a hydrogen atom, a lower alkyl group or a lower alkoxyl group; m represents a number of 1-3; and n represents 0 or 1.)

10 Claims, No Drawings

AZO COMPOUND AND DYE POLARIZING FILM CONTAINING THE SAME

This application is a divisional of U.S. patent application Ser. No. 12/227,994 filed Dec. 4, 2008, which is a 371 of PCT/JP2007/061813 filed Jun. 12, 2007, which claims priority of Japanese Patent Application No. 2006-162990 filed Jun. 13, 2006, the disclosures of which are incorporated herein by reference.

TECHNICAL FIELD

The present invention relates to a novel azo compound and a salt thereof, and a dye-containing polarizing film comprising the compound.

BACKGROUND ART

A polarizing plate having a function to transmit or shield light is a fundamental constituent element of a display device such as a liquid crystal display (LCD) along with liquid crystals which have a function of switching light. The area of application of this LCD has expanded broadly from small items such as an electronic calculator, a watch, and the like in the early day to a notebook computer, a word processor, a liquid crystal projector, a liquid crystal television, a car navigation system, indoor and outdoor measurement instruments, and the like. Also, the LCD is used in broad conditions from low to high temperature, from low to high humidity, and from low to high light intensity. Thus, a polarizing plate having high polarizing performance and excellent durability is desired.

At present, a polarizing film is manufactured by dyeing a polarizing film substrate with or incorporating therein iodine or a dichromatic dye as a polarizing element, wherein the substrate is a stretched and oriented film of polyvinyl alcohol or its derivative, or an oriented film of polyene prepared by dehydrochlorination of a polyvinyl chloride film or dehydration of a polyvinyl alcohol film. Among these, an iodine polarizing film which uses iodine as the polarizing element exhibits superior initial polarizing performance. On the other hand, this polarizing film is weak to moisture and heat, and when it is used for a long time under a condition of high temperature and high humidity, there arises a problem of durability. In order to improve durability, methods such as treatment of a polarizing film with formalin or an aqueous solution containing boric acid, use of a polymer film of low moisture permeability as a protect film, and the like are considered. However, the effects of these methods are not satisfactory. On the other hand, a dye-containing polarizing film comprising a dichromatic dye as a polarizing element has better humidity resistance and heat resistance than an iodine polarizing film, but, generally, initial polarizing performance of the dye-containing polarizing element is insufficient.

In a neutral color polarizing film produced by adsorbing several dichromatic dyes to a polymer film followed by orientation, if there is light leakage (color leakage) of a specific wavelength in the wavelength range of visible light, in a state (the perpendicular position) that two polarizing films are superimposed on each other in such a way that their orientation directions are perpendicular to each other, the hues of the liquid crystal display may change in the dark state when the polarizing films are fitted to the liquid crystal display panel. Thus, in order to prevent the color change of a liquid crystal display due to color leakage of a specific wavelength in the dark state when a polarizing film is fitted to a liquid crystal display device, it is necessary to uniformly lower the transmittance at the perpendicular position (perpendicular transmittance) in the wavelength range of visible light.

Further, in a case of a color liquid crystal projection display, namely, a color liquid crystal projector, a polarizing plate is used for a liquid crystal image-forming part. In this application, the iodine polarizing plate was used formerly, which has good polarization performance and exhibits neutral gray color. However, as mentioned above, the iodine polarizing plate has a problem that its light resistance, heat resistance, and wet heat resistance are insufficient, because iodine is a polarizer. In order to solve this problem, a neutral gray polarizing plate using a dye-containing dichromatic colorant as a polarizer has come to be used. In a neutral gray polarizing plate, colorants of three primary colors are generally used in combination in order to improve transmittance in the entire wavelength range of visible light and polarization performance averagely. Thus, there is a problem that to the demand of the marketplace for more brightness as in the color liquid crystal projector, the transmittance is still poor, and in order to realize brightness, it is necessary to increase intensity of the light source. In order to solve this problem, three polarizing plates corresponding to three primary colors, namely, plates for each of the blue channel, the green channel, and the red channel have come to be used.

Decrease in brightness cannot be avoided because light is absorbed considerably by the polarizing plate, and an image of such a small area as 0.5 to 3 inches is magnified to about several tens to one hundred and tens of inches. Therefore, as the light source, one of high luminance is used. Furthermore, desire for further increase in brightness of a liquid crystal projector is strong and, as a result, the intensity of the light source used is inevitably growing stronger. Along with this, the amounts of light and heat which the polarizing film receives are increasing.

Examples of the dyes used for production of the above-mentioned dye-containing polarizing films include water-soluble azo compounds described, for example, in the Patent Document 1 to Patent Document 5.

However, conventional polarizing plates containing the water soluble dyes have not yet satisfied the market needs sufficiently in terms of polarization characteristics, the range of absorption wavelength, hues, and the like. Furthermore, among the polarizing plates corresponding to three primary colors for a color liquid crystal projector, namely, the plates for each of the blue channel, the green channel, and the red channel, none is good in all aspects of brightness, polarization performance, durability under conditions of high temperature and high humidity, and resistance to prolonged irradiation of light.

Improvement is thus desired.

Patent Document 1: JP-A-2001-33627
Patent Document 2: JP-A-2001-56412

Patent Document 3: Japanese Patent No. 2,622,748
Patent Document 4: Japanese Patent Application No. 2004-338876
Patent Document 5: JP-A-2004-51645
Non-Patent Document 1: "Senryo Kagaku (Dye Chemistry)" written by Yutaka Hosoda

DISCLOSURE OF THE INVENTION

An object of the present invention is to provide a polarizing plate of high performance having excellent polarization performance and resistance to humidity, heat, and light. Further, another object of the present invention is to provide a polarizing plate of high performance which does not cause color leakage at the perpendicular position in the wavelength range of visible light and which has excellent polarization performance and resistance to humidity, heat, and light, the polarizing plate being a neutral color polarizing plate produced by adsorbing two or more dichromatic dyes in a polymer film, followed by orientation thereof.

A further object of the present invention is to provide polarizing plates of high performance corresponding to three primary colors for a color liquid crystal projector, which are good in all of brightness, polarization performance, durability, and light resistance.

The present inventors have conducted intensive studies in order to attain the above objects. As a result, it has been found that a polarizing film and a polarizing plate containing a specific azo compound and/or a salt thereof have excellent polarizing performance and moisture resistance, heat resistance and light resistance, and thus, the present invention has been accomplished. That is, the constitution of the present invention is as follows.

(1) An azo compound represented by the following formula (1):

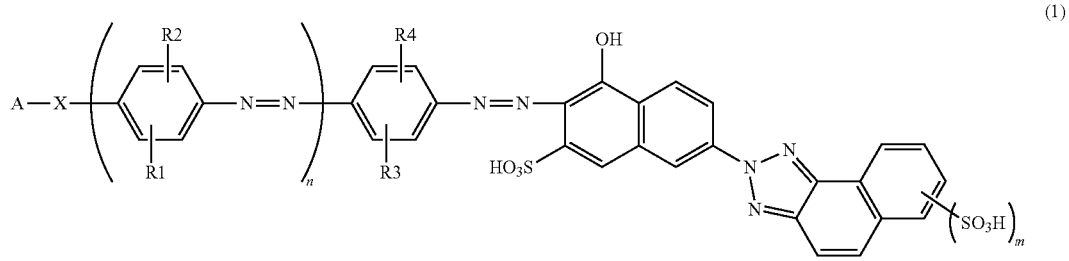

wherein A represents a phenyl group having a substituent group or a naphthyl group having 1 to 3 sulfonic acid groups and X represents —N=N— or —NHCO—; R1 to R4 each independently represent a hydrogen atom, a lower alkyl group or a lower alkoxyl group; m=1 to 3; and n=0 or 1, or a salt thereof.

(2) An azo compound represented by the following formula (2):

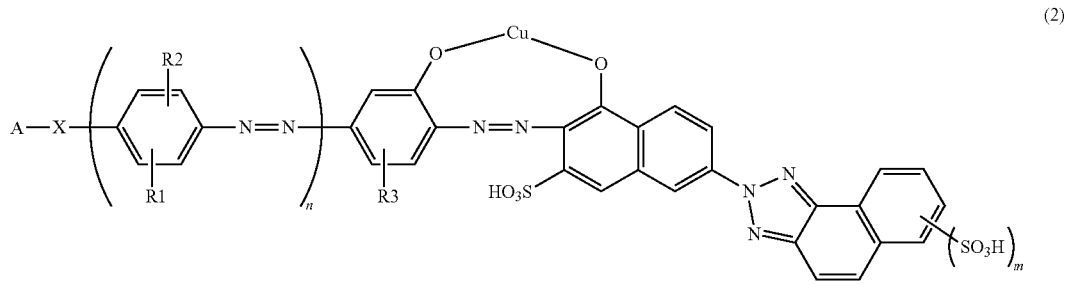

wherein A, X, R1 to R3, m and n represent the same meanings as in the formula (1), or a salt thereof.

(3) The azo compound or a salt thereof according to (1) or (2) wherein A is the following formula (3):

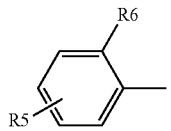

(3)

wherein R5 and R6 each independently represent a hydrogen atom, a carboxyl group, a sulfonic acid group, a nitro group, a lower alkyl group or a lower alkoxyl group.

(4) The azo compound or a salt thereof according to (1) or (2) wherein A is a naphthyl group having one or two sulfonic acid groups.

(5) The azo compound or a salt thereof according to any one of (1) to (4) wherein R1 to R4 are each independently a hydrogen atom, a lower alkyl group or a lower alkoxyl group.

(6) A dye-containing polarizing film comprising one or more azo compounds and/or salts thereof according to any one of (1) to (5) in a polarizing film base material.

(7) A dye-containing polarizing film comprising one or more azo compounds and/or salts thereof according to any one of (1) to (5) and one or more other organic dyes in a polarizing film base material.

(8) A dye-containing polarizing film comprising two or more azo compounds and/or a salt thereof according to any one of (1) to (5) and one or more other organic dyes in a polarizing film base material.

(9) The dye-containing polarizing film according to any one of (6) to (8) wherein the polarizing film base material is a film comprising a polyvinyl alcohol resin.

(10) A dye-containing polarizing plate formed by adhering a transparent protective film to at least one surface of a dye-containing polarizing film according to any one of (6) to (9).

(11) A polarizing plate for a liquid crystal display comprising a dye-containing polarizing film or a dye-containing polarizing plate according to any one of (6) to (10).

(12) A color polarizing plate for a liquid crystal projector comprising a dye-containing polarizing film or a dye-containing polarizing plate according to any one of (6) to (10).

The azo compound of the present invention or the salt thereof is useful as a dye for a polarizing film. The polarizing films containing the compound have a high polarizing performance comparable to that of polarizing films which use iodine, and are excellent also in durability. Therefore, they are suitable for various liquid crystal display devices and liquid crystal projectors, uses in vehicles which need high polarizing performance and durability, and display uses of industrial instruments used in various environments.

BEST MODE FOR CARRYING OUT THE INVENTION

The azo compounds of the present invention and the salts thereof are represented by formula (1) or (2). In formula (1) or (2), A represents a phenyl group having a substituent group or a naphthyl group having 1 to 3 sulfonic acid groups, but A is preferably a phenyl group represented by formula (3) or a naphthyl group having one or two sulfonic acid groups. It is more preferably that a phenyl group represented by formula (3) is a phenyl group in which R5 is a sulfonic acid group, a carboxyl group, a lower alkyl group or a lower alkoxyl group, and R6 is a hydrogen atom, a sulfonic acid group, a carboxyl group or a lower alkyl group. R1 to R4 each independently represent a hydrogen atom, a lower alkyl group or a lower alkoxyl group, but preferably a hydrogen atom, a methyl group or a methoxy group. X represents —N=N— or —NHCO—. The symbol m represents 1 to 3 and n represents 0 or 1. It is particularly preferable that n is 0 or 1 and m is 2. Specific examples of the azo compounds represented by formula (1) or (2) or the salts thereof used in the present invention include the following (formula's (4) to (25)). Here in the following formulas, the sulfonic acid group, carboxyl group and hydroxyl group are shown in free acid forms.

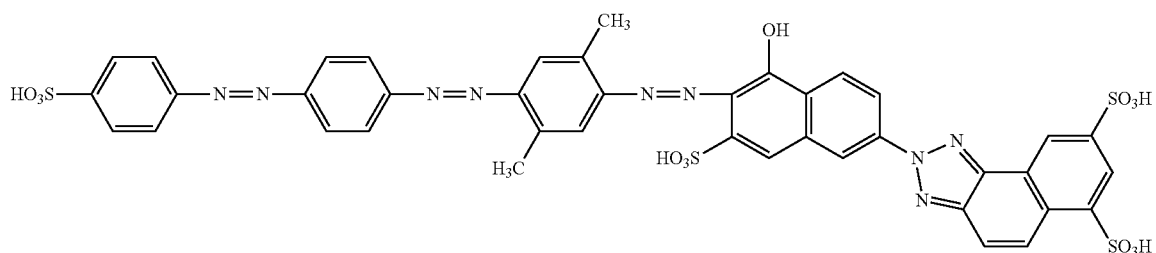

(4)

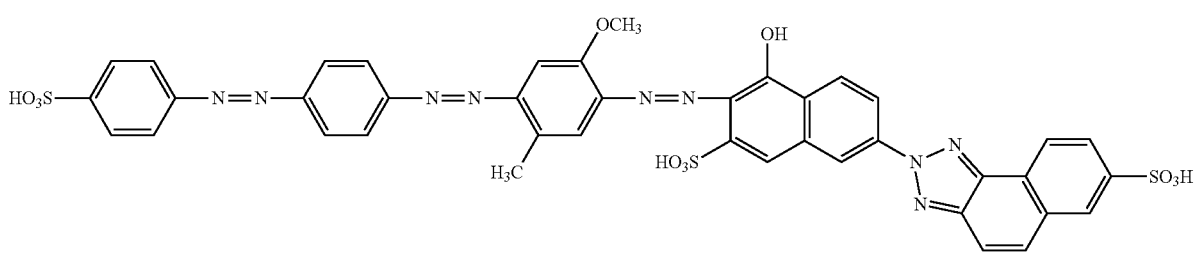

(5)

-continued
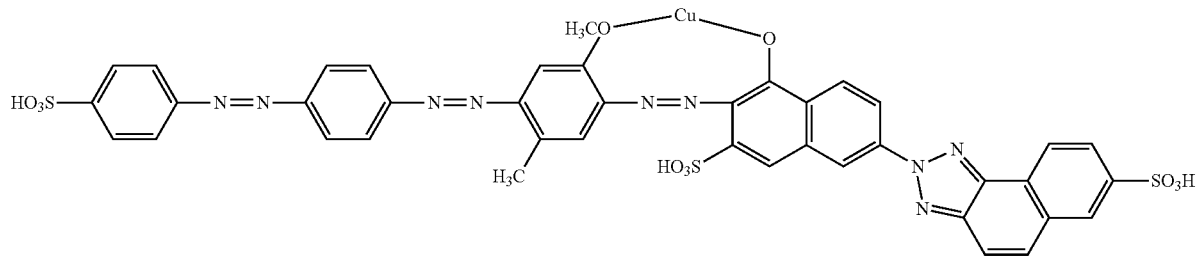
(6)
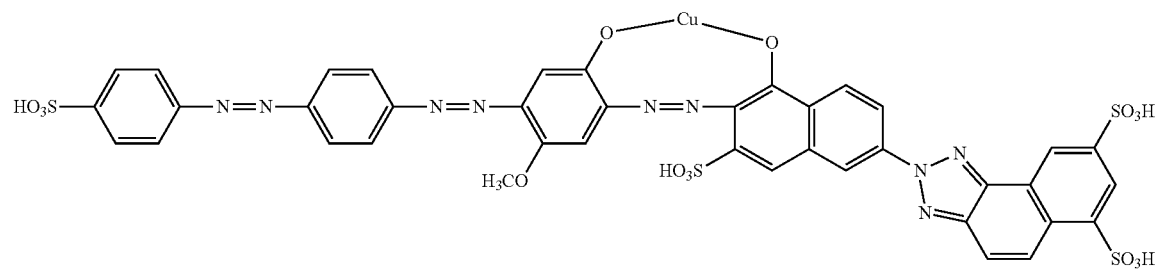
(7)
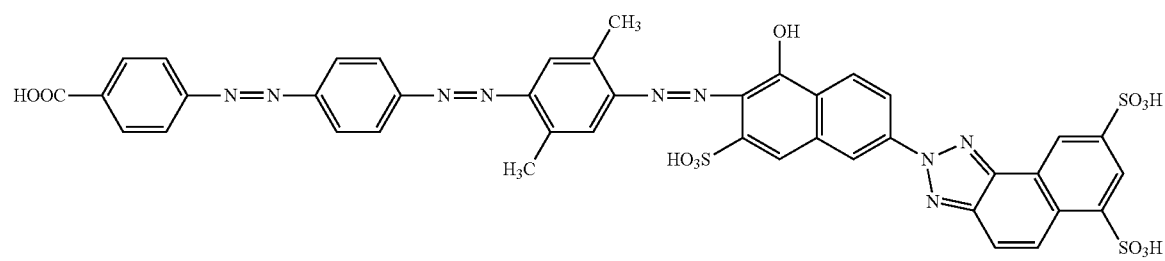
(8)
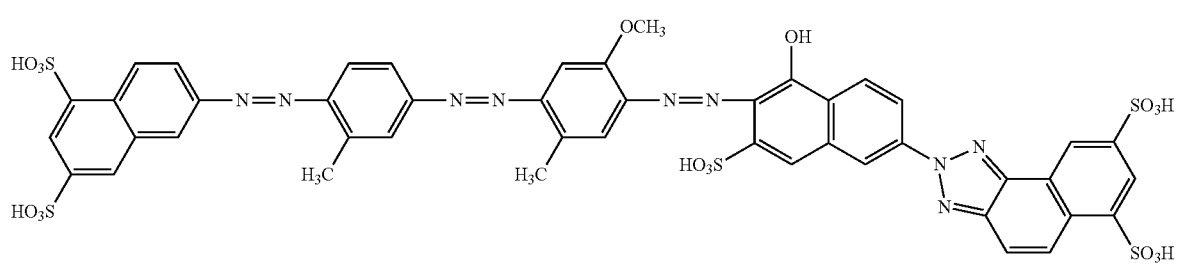
(9)
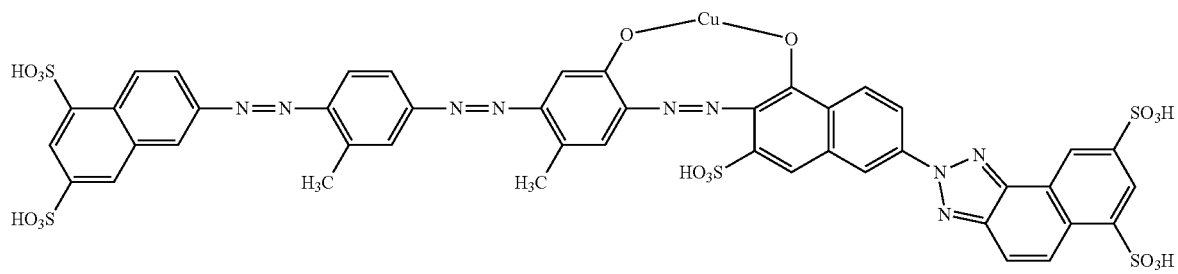
(10)

-continued
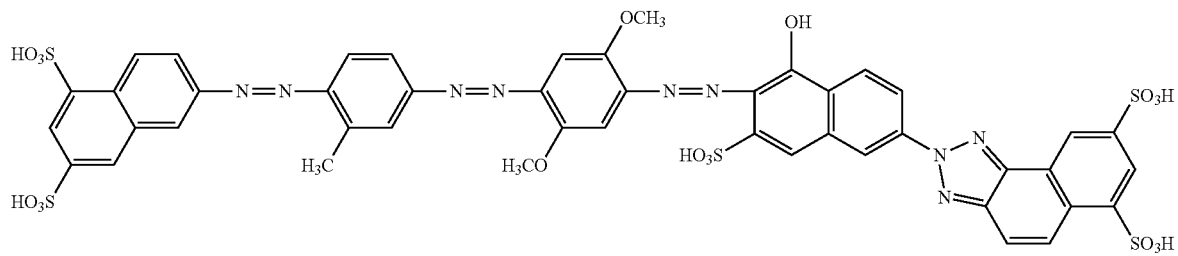
(11)
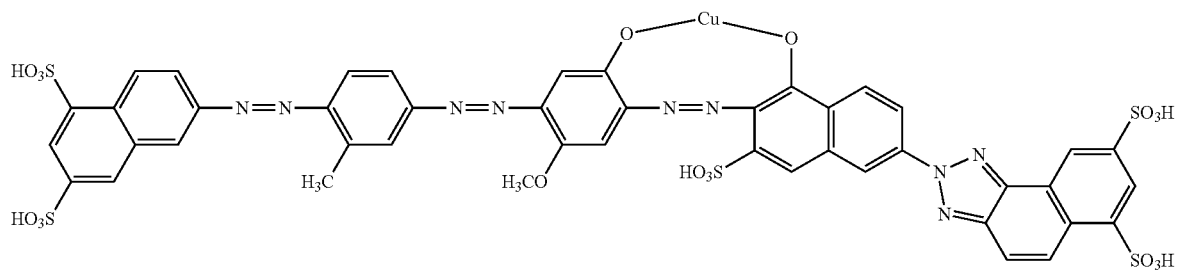
(12)
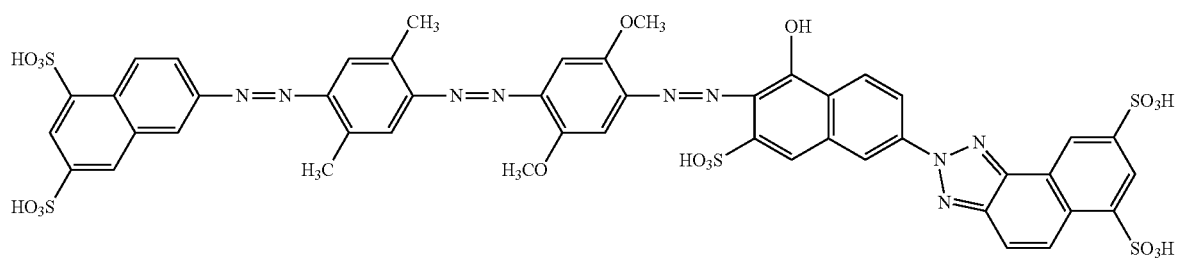
(13)
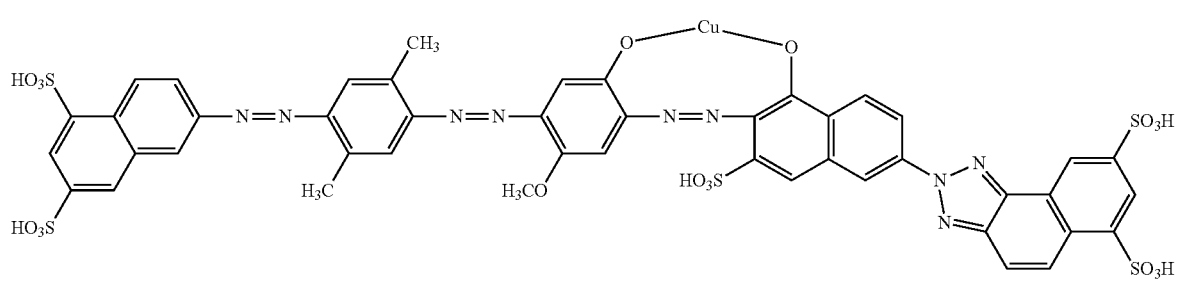
(14)
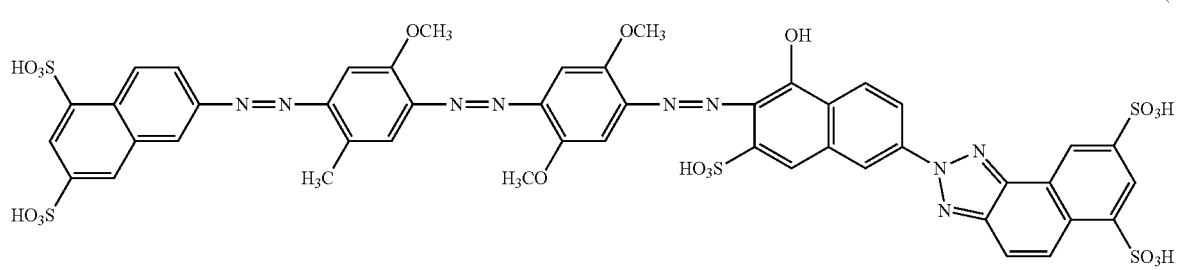
(15)

(16)
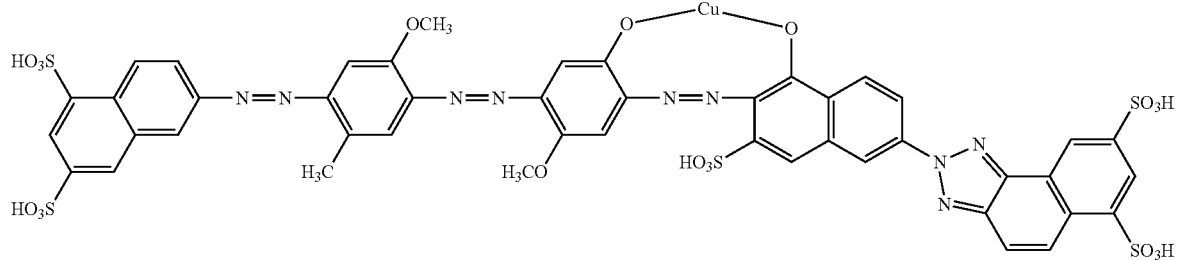
(17)
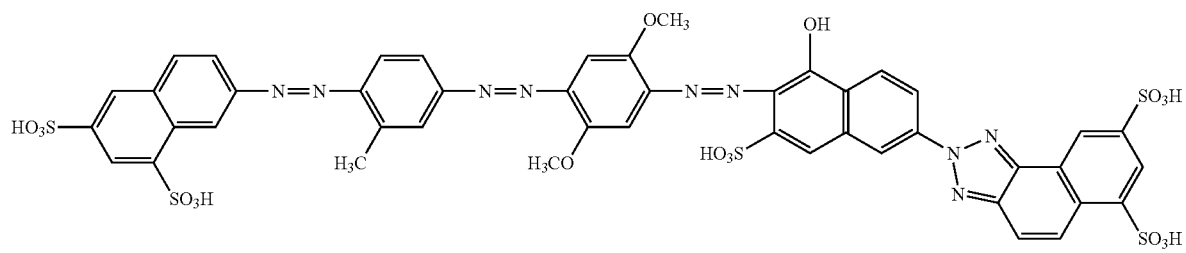
(18)
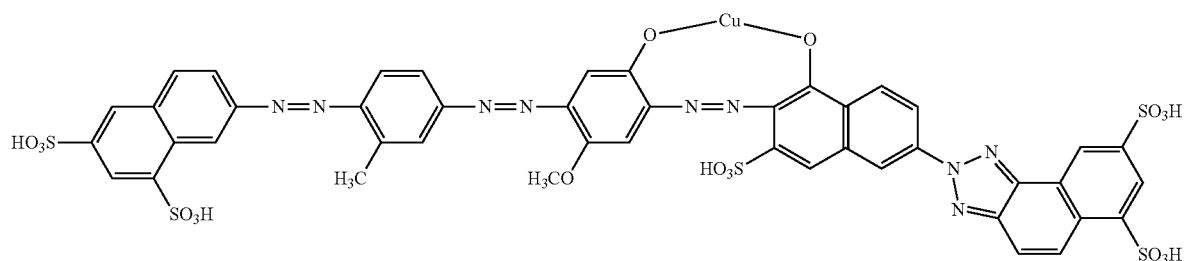
(19)
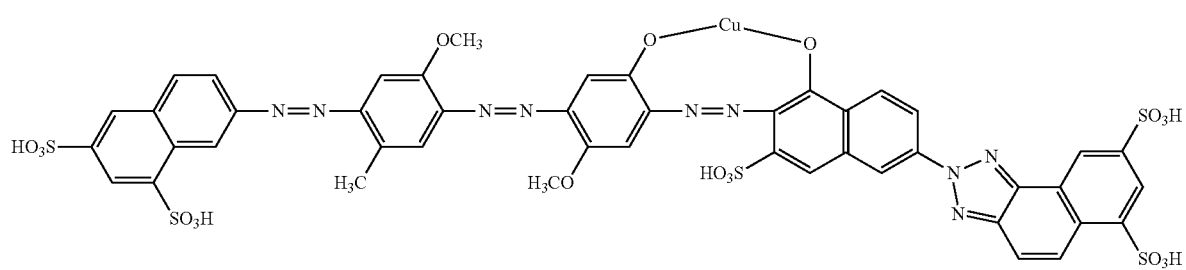
(20)
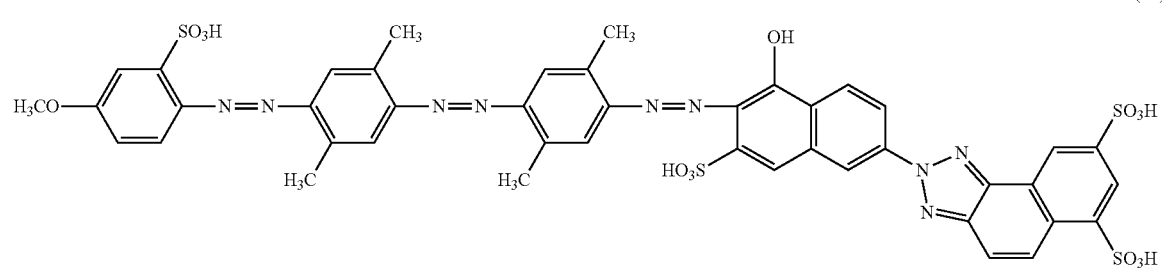

-continued
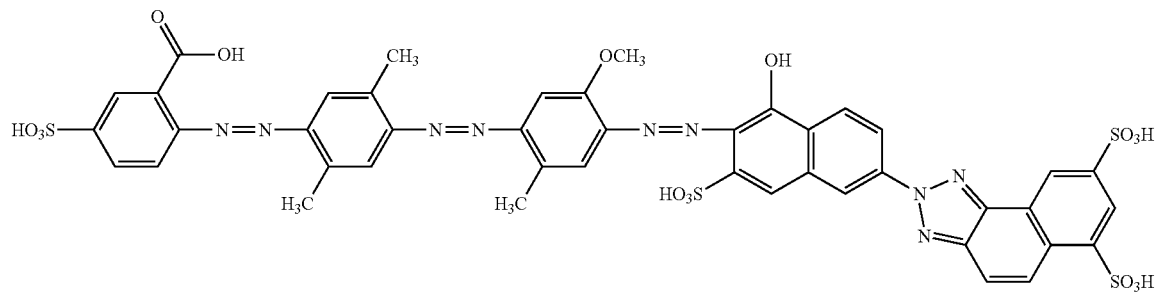
(21)
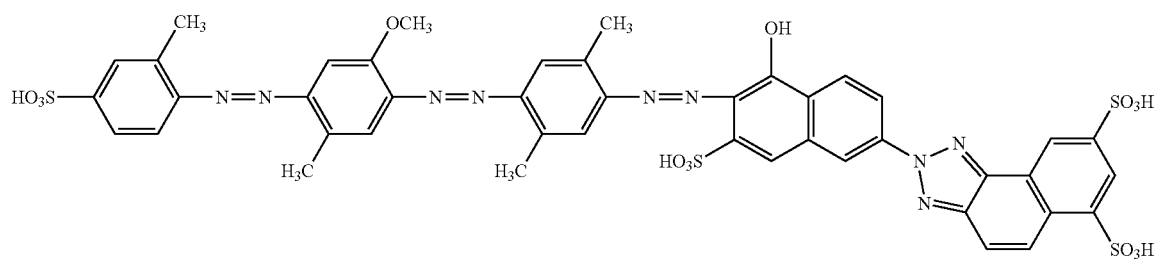
(22)
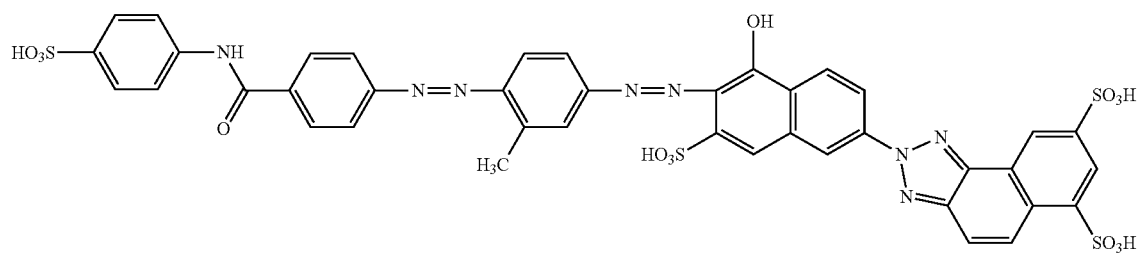
(23)
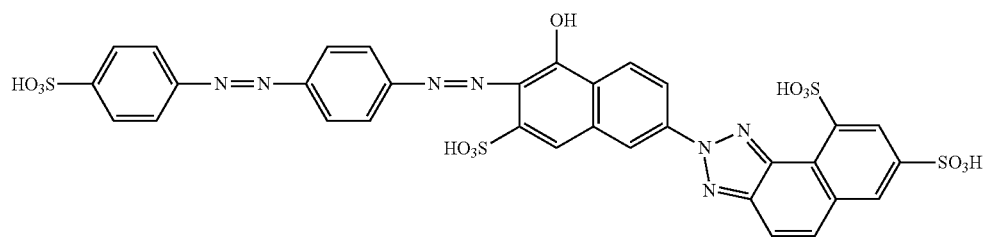
(24)
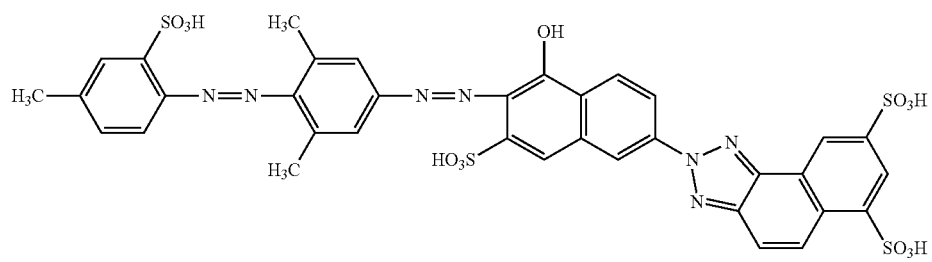
(25)

The azo compound represented by formula (1) can be easily prepared by carrying out known diazotization and coupling in accordance with a general manufacturing method of azo dyes as described in Non-Patent Document 1. A specific example of the manufacturing method is shown below: In the case that X is an azo group (—N═N—), an amino group containing compound represented by the following formula (A) is diazotized and coupled with an aniline represented by the following formula (B) to obtain a monoazo amino compound (following formula (C)).

    (A)

wherein A represents the same meanings as in the formula (1).

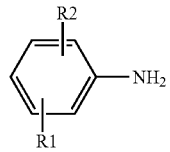    (B)

wherein R1 and R2 represent the same meanings as in the formula (1).

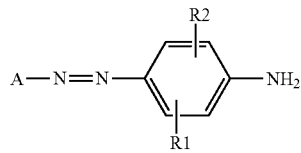    (C)

Subsequently, this monoazo amino compound is diazotized and subjected to a secondary coupling with an aniline represented by the following formula (D) to obtain a disazo amino compound represented by the following formula (E).

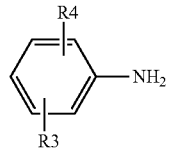    (D)

wherein R3 and R4 represent the same meanings as in the formula (1).

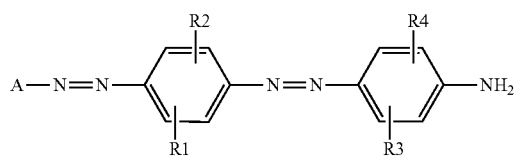    (E)

This disazo amino compound is diazotized and subjected to a third coupling with a naphthol represented by the following formula (F) to obtain an azo compound represented by formula (1).

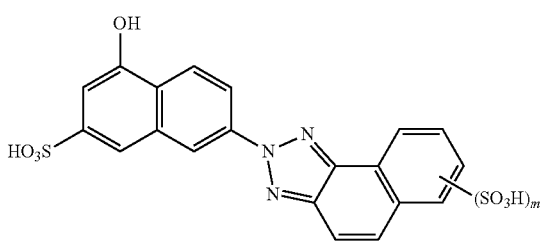    (F)

wherein m represents the same meanings as in the formula (1).

In the case that X is —NHCO—, the above formula (A) is reacted with p-nitrobenzoyl chloride, and after that, an azo compound of formula (1) is obtained using the following formula (G) obtained by reducing a nitro group in the same manner as in the case that X is an azo group.

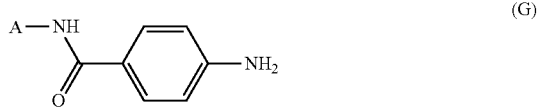    (G)

wherein A represents the same meanings as in the formula (1).

In the above reaction, the diazotizing step may be carried out by a sequential method of adding a nitrite salt such as sodium nitrite into an aqueous mineral acid solution or suspension containing a diazo component, such as aqueous hydrochloric acid or aqueous sulfuric acid. Alternatively, it may be carried out by a reverse method where a nitrite salt is added beforehand to a neutral or weakly alkaline aqueous solution of the diazo component and this solution is mixed with the mineral acid. The diazotizing temperature is suitably −10° C. to +40° C. The coupling step with an aniline is carried out by mixing an acidic aqueous solution of the latter in aqueous hydrochloric acid, aqueous acetic acid or the like with each of the above diazo solutions and carrying out the coupling at a temperature of −10° C. to +40° C. under an acidic condition of pH 2 to 7.

The monoazo compound and disazo compound obtained by the coupling may be isolated as they are or by separating the compounds by acid precipitation or salting-out, and then filtering off the compound or alternatively, the step may proceed to the next step with the compounds being in the state of solution or suspension. In the case that the diazonium salt is hardly soluble and is in the state of suspension, the suspension can be filtered to obtain a press cake, which is used at the next coupling step.

The third coupling reaction of the diazotized product of the disazoamino compound with the naphthol represented by the formula (F) is carried out at a temperature of −10° C. to +40° C. under a neutral to alkaline condition of pH 7 to 10. After completion of the reaction, the objective product is precipitated by salting-out and isolated by filtration. If purification is required, it can be performed by repeating the salting-out or precipitating the objective product from water using an organic solvent. The organic solvent used for the purification includes water-soluble organic solvents, for example, alcohols such as methanol and ethanol, and ketones such as acetone.

Here as for the azo compound represented by formula (1) in the present invention, it can be used as a free acid, and besides, a salt of the azo compound can be used. Examples of such a salt include alkaline metal salts such as a lithium salt, a sodium salt and a potassium salt, and organic salts such as an ammonium salt and an amine salt. A sodium salt is generally used.

Examples of the amine represented by A which is a starting material used for synthesis of the azo compound represented by formula (1) and the salt thereof include 4-aminobenzenesulfonic acid, 3-aminobenzenesulfonic acid, 2-aminobenzenesulfonic acid, 4-aminobenzoic acid, 2-amino-5-methylbenzenesulphonic acid, 4-amino-2-methylbenzenesulphonic acid, 2-amino-5-methoxy benzenesulphonic acid, 3-amino-4-methoxybenzenesulphonic acid, 2-amino-4-sulfobenzoic acid, 2-amino-5-sulfobenzoic acid in the case that A is a phenyl group having a substituent group. Of these, 4-aminobenzenesulfonic acid, 4-aminobenzoic acid, 2-amino-5-methoxybenzenesulphonic acid, 2-amino-4-sulfobenzoic acid and 4-amino-2-methylbenzenesulphonic acid are preferable. In the case that A is a naphthyl group having a sulfonic acid group, examples thereof include 4-aminonaphthalenesulfonic acid, 7-aminonaphthalene-3-sulfonic acid, 1-aminonaphthalene-6-sulfonic acid, 1-aminonaphthalene-7-sulfonic acid, 7-aminonaphthalene-1,3-disulfonic acid, 6-aminonaphthalene-1,3-disulfonic acid, 7-aminonaphthalene-1,5-disulfonic acid and 7-aminonaphthalene-1,3,6-trisulfonic acid. Of these, 7-aminonaphthalene-3-sulfonic acid, 6-aminonaphthalene-1,3-disulfonic acid and 7-aminonaphthalene-1,5-disulfonic acid are preferable.

Examples of the substituents in the anilines (formula (B) or (D)) which may have substituents (R1 and R2 or R3 and R4) and are the primary and secondary coupling components, include a hydrogen atom, a methyl group, an ethyl group, a methoxy group, an ethoxy group and an acetylamino group. One or two of these substituent groups may be connected. The bonding position thereof may be 2-position, 3-position, 2-position and 5-position, 3-position and 5-position or 2-position and 6-position in respect to the amino group. 3-Position or 2-position and 5-position is preferable. Examples of the anilines include aniline, 2-methylaniline, 3-methylaniline, 2-ethylaniline, 3-ethylaniline, 2,5-dimethylaniline, 2,5-diethylaniline, 2-methoxyaniline, 3-methoxyaniline, 2-methoxy-5-methylaniline, 2,5-dimethoxyaniline, 3,5-dimethylaniline, 2,6-dimethylaniline and 3,5-dimethoxyaniline. In these anilines, the amino group may be protected.

Examples of the protecting group include an ω-methanesulfonic acid group. The anilines used for primary coupling and the anilines used for secondary coupling may be the same or different.

Naphthols represented by formula (F) which is the third coupling component mentioned above include naphthols having 1 to 3 sulfonic acid groups. The number of sulfonic acid groups is preferably 1 or 2.

In the dye-containing polarizing film or the dye-containing polarizing plate of the present invention, the azo compound represented by the formula (1) or a salt thereof may be used singly or in a combination of two or more, and, in addition, if necessary, one or more of other organic dyes may be used in combination. The organic dyes combined are not particularly limited, and are preferably those which have absorption characteristics in a wavelength range different from the absorption wavelength range of the azo compound of the present invention or a salt thereof and which are high in dichroism. Examples of these organic dyes include C. I. Direct Yellow 12, C. I. Direct Yellow 28, C. I. Direct Yellow 44, C. I. Direct Orange 26, C. I. Direct Orange 39, C. I. Direct Orange 71, C. I. Direct Orange 107, C. I. Direct. Red 2, C. I. Direct. Red 31, C. I. Direct Red 79, C. I. Direct Red 81, C. I. Direct Red 247, C. I. Direct. Green 80, C. I Direct. Green 59 and dyes described in Patent Documents 1 to 4. These dyestuffs are used as free acids, or alkali metal salts (e.g., Na salts, K salts and Li salts), ammonium salts, and amine salts.

If the other organic dyes are used in combination as necessary, the kind of the dyes added varies depending on the objective polarizing films, namely, depending on whether they are polarizing films of neutral color, color polarizing films for a liquid crystal projector, or other color polarizing films. The amount of the dyes added is not particularly limited, and generally it is preferred to use one or more of the organic dyes in an amount of 0.1 to 10 parts by weight in total based on the weight of the azo compound of formula (1) or a salt thereof.

The dye-containing polarizing film of the present invention or the polarizing film used in a polarizing plate having various hues and neutral color for a color liquid crystal projector can be produced by incorporating the azo compound represented by formula (1) or a salt thereof, if necessary, together with other organic dyes into a polymer film which is a material of the polarizing film by a known method. The resulting polarizing film is provided with a protective film and can be used as a polarizing plate, if necessary, provided with a protective layer or an AR (anti-reflection) layer, and a support or the like. These polarizing plates are used for a liquid crystal projector, an electronic calculator, a watch, a notebook computer, a word processor, a liquid crystal television, a car navigation system, indoor and outdoor measuring instruments or a display, etc.

The base material (polymer film) of the polarizing film used for a dye-containing polarizing film of the present invention is suitably a base material comprising polyvinyl alcohol. Examples of the polyvinyl alcohol base material include polyvinyl alcohol or the derivatives thereof and either one of those modified with an olefin such as ethylene and propylene, an unsaturated carboxylic acid such as crotonic acid, acrylic acid, methacrylic acid and maleic acid. Above all, a film comprising polyvinyl alcohol or the derivatives thereof are preferably used from a viewpoint of the adsorption and orientation of a dye. The thickness of the base material is usually about 30 to 100 μm, preferably about 60 to 90 μm.

The azo compound of formula (1) and/or a salt thereof can usually be contained in the base material (polymer film) of the polarizing film by a method of dyeing a polymer film. The dyeing is carried out, for example, in the following manner. First, the azo compound of the present invention and/or a salt thereof, and, if necessary, other organic dyes are dissolved in water to prepare a dye bath. The concentration of the dyes in the dye bath is not particularly limited but usually selected from the range of about 0.001 to 10% by weight. Furthermore, a dyeing auxiliary may be used as required and, for example, sodium sulfate is suitably used in a concentration of about 0.1 to 10% by weight. Dyeing is carried out by dipping the polymer film in the thus prepared dye bath for 1 to 10 minutes. The dyeing temperature is preferably about 40 to 80° C.

Orientation of the water-soluble dye is carried out by stretching the polymer film dyed as mentioned above. As the stretching method, any publicly known methods such as wet method, dry method and the like may be employed. In some cases, stretching of the polymer film may be carried out before dyeing, if necessary. In this case, orientation of the water-soluble dye is performed at the time of the dyeing. If necessary, the polymer film in which the water-soluble dye is incorporated and orientated may, as required, be subjected to an after-treatment such as boric acid treatment by a known method. Such after-treatment is carried out for the purpose of improving the light transmittance and degree of polarization of the polarizing film. The conditions of the boric acid treatment varies depending on the kind of the polymer film used and the kind of the dye used. Generally, the concentration of boric acid in its aqueous solution is in the range of 0.1 to 15% by weight, preferably 1 to 10% by weight the treatment is carried out by dipping at the temperature range of 30 to 80° C., preferably 40 to 75° C. for 0.5 to 10 minutes. Furthermore, if necessary, a fixing treatment may be carried out with an aqueous solution containing a cationic polymer compound.

To one or both surfaces of the dye-containing polarizing film of the present invention thus obtained, transparent protective films excellent in optical transparency and mechanical strength may be adhered to produce a polarizing plate. As materials to form the protective film, there may be used, for example, in addition to cellulose acetate films and acrylic films, fluorine films such as ethylene tetrafluoride/propylene hexafluoride copolymers, and films composed of a polyester resin, a polyolefin resin or a polyamide resin. Preferably a triacetylcellulose (TAC) film and a cyclo-olefin film are used. The thickness of the protective film is usually 40 to 200 μm. Examples of the adhesives used for adhering the polarizing film to the protective film include a polyvinyl alcohol adhesive, an urethane emulsion adhesive, an acrylic adhesive, and a polyester-isocyanate adhesive. The polyvinyl alcohol adhesive is preferable.

A transparent protective layer may further be provided on the surface of the dye-containing polarizing plate of the present invention. Examples of the protective layer include an acrylic or polysiloxane hard coat layer and a urethane protective layer. In order to further improve single plate average light transmittance, it is preferred to provide an Anti-Reflective layer on the protective layer. The AR layer can be formed, for example, by vapor deposition or sputtering of a material such as silicon dioxide or titanium oxide. It can be also formed by thinly coating a fluorine material. The dye-containing polarizing plate of the present invention can also be used as an elliptically polarizing plate made by adhering a phase difference plate.

The dye-containing polarizing plate of the present invention made as mentioned above has neutral color and has characteristics that it shows no color leakage at the perpendicular position in the wavelength range of the visible light, is excellent in polarizing performance, shows no change of color or deterioration of polarizing performance even under a condition of high temperature and high humidity, and is less in light leakage at the perpendicular position in the range of visible light.

The color polarizing plate for a liquid crystal projector in the present invention contains the azo compound represented by formula (1) or a salt thereof as a dichroic molecule and, if necessary, additionally with the above-mentioned other organic dyes. The polarizing film used in the color polarizing plate for a liquid crystal projector in the present invention is also produced by the method explained above with reference to the production of the dye-containing polarizing film. A protective film is further provided on the polarizing film to make a polarizing plate, and, if necessary, a protective layer or an AR layer and a support, etc. are provided, which is used as a color polarizing plate for a liquid crystal projector.

As a color polarizing plate for a liquid crystal projector, desirably the single plate average light transmittance is 39% or higher and the average light transmittance at the perpendicular position is 0.4% or lower in the wavelength range necessary for the polarizing plate (A: when an ultra-high pressure mercury lamp is used; 420 to 500 nm for blue color channel, 500 to 580 nm for green color channel and 600 to 680 nm for red color channel, B: peak wavelengths when a trichromatic LED lamp is used; 430 to 450 nm for blue color channel, 520 to 535 nm for green color channel and 620 to 635 nm for red color channel). More preferably the single plate average light transmittance is 41% or higher and the average light transmittance at the perpendicular position is 0.3% or lower, more preferably 0.2% or lower in the wavelength range necessary for the polarizing plate. Further preferably, the single plate average light transmittance is 42% or higher and the average light transmittance at the perpendicular position is 0.1% or lower in the wavelength range necessary for the polarizing plate. The color polarizing plate for a liquid crystal projector of the present invention has brightness and excellent polarizing performance as mentioned above.

The color polarizing plate for a liquid crystal projector of the present invention is preferably a polarizing plate with an AR layer mentioned above which is made by providing an AR layer on a polarizing plate consisting of a polarizing film and a protective film. More preferred is a polarizing plate with an AR layer and a support which is made by adhering the polarizing plate with an AR layer to a support such as a transparent glass plate.

The single plate average light transmittance is an average value of light transmittances in a specific wavelength range when a natural light enters one polarizing plate without an AR layer and a support such as a transparent glass plate provided (hereafter simply referred to as "polarizing plate" in the same sense). The average light transmittance at the perpendicular position is an average value of light transmittances in a specific wavelength range when a natural light enters two polarizing plates disposed with the orientation directions perpendicular to each other.

The color polarizing plate for a liquid crystal projector of the present invention is generally used as a polarizing plate with a support. The support is preferably one which has a flat part because the polarizing plate is adhered to the support. The support is also preferably a molded article of glass because the polarizing plate is for optical use. Examples of the molded articles of glass include a glass plate, a lens, a prism (e.g., a triangular prism, a cubic prism), etc. A lens to which the polarizing plate is adhered can be utilized as a condenser lens with a polarizing plate in the liquid crystal projector. A prism to which the polarizing plate is adhered can be utilized as a polarizing beam splitter with a polarizing plate or as a dichromatic prism with a polarizing plate in the liquid crystal projector. Furthermore, the polarizing plate may be adhered to a liquid crystal cell. Examples of the glass materials include inorganic glasses such as soda glass, borosilicate glass and sapphire glass and organic glasses such as acrylic glass and polycarbonate glass. The inorganic glasses are preferred. The thickness and size of the glass plate may be chosen as desired. In the case of the polarizing plate with glass, it is preferred to provide an AR layer on one or both of the glass surface or the polarizing plate surface for further improvement of the single plate average light transmittance.

The color polarizing plate with a support for a liquid crystal projector can be produced, for example, by coating a transparent adhesive (pressure sensitive adhesive) on the flat part of the support and then adhering the dye-containing polarizing plate of the present invention to the coated surface. Furthermore, it may also be produced by coating a transparent adhesive (pressure sensitive adhesive) on the polarizing plate and then adhering the support to the coated surface. The adhesive (pressure sensitive adhesive) used here is preferably, for example, of acrylic ester adhesive. In the case of using this polarizing plate as an elliptically polarizing plate, usually the phase difference plate side is adhered to the support side, but the polarizing plate side may be adhered to the molded article of glass.

That is, in the color liquid crystal projector using the dye-containing polarizing plate of the present invention, the dye-containing polarizing plate of the present invention is disposed on either one or both of the incident side and the outgoing side of a liquid crystal cell. The polarizing plate may either contact or not with the liquid crystal cell, but preferably it does not contact with the liquid crystal cell from the viewpoint of durability. When the polarizing plate contacts with the liquid crystal cell on the outgoing side, there may be used the dye-containing polarizing plate of the present invention which uses the liquid crystal cell as a support. When the polarizing plate does not contact with the liquid crystal cell, it is preferred to use the dye-containing polarizing plate of the present invention which uses a support other than the liquid crystal cell. From the viewpoint of durability, preferably the dye-containing polarizing plates of the present invention are disposed on both the incident side and the outgoing side of the liquid crystal cell. More preferably the dye-containing polarizing plates of the present invention are disposed in such a manner that the side of the polarizing plate faces the liquid crystal cell and the side of the support faces the light source. The incident side of the liquid crystal cell means the side of light source and the opposite side is called the outgoing side.

In the color liquid crystal projector using the dye-containing polarizing plate of the present invention, it is preferred to dispose an ultraviolet light-cutting filter between the light source and the above polarizing plate with a support on the incident side. The liquid crystal cell used is preferably one which is, for example, active matrix type formed by encapsulating liquid crystals between a transparent substrate on which an electrode and a TFT are formed and a transparent substrate on which a counter electrode is formed. Light emitted from a light source such as an ultra-high pressure mercury lamp (UHP lamp), a metal halide lamp and a white LED passes through the ultraviolet-cutting filter and separates into three primary colors, and thereafter they pass through color polarizing plates with a support for each of channels of blue color, green color and red color, then are integrated, magnified by a projector lens, and projected on a screen. Alternatively, LEDs or lasers of blue color, green color and red color are used and light emitted from LED or laser of each color passes through color polarizing plates with a support for the each of channels of blue color, green color and red color, then are integrated, magnified by a projector lens, and projected on a screen.

The color polarizing plate for a liquid crystal projectors thus constituted has characteristics that it is excellent in polarizing performance, and shows neither change of color nor deterioration of polarizing performance even under a high temperature and high humidity condition.

EXAMPLES

Hereinbelow, the present invention will be explained in more detail by way of examples, which are exemplary only and should not be construed as limiting the invention in any manner. All "%" and "parts" in the examples are by weight, unless otherwise notified.

Example 1

27.7 parts of 4-(4'-aminophenyl)-azobenzenesulfonic acid were added to 500 parts of water and dissolved with sodium hydroxide. 32 parts of 35% aqueous hydrochloric acid were added thereto followed by addition of 6.9 parts of sodium nitrite and the mixture was stirred for one hour. 12.1 parts of 2,5-dimethylaniline dissolved in dilute hydrochloric acid water were added thereto and pH was adjusted to 3 by adding sodium carbonate while stirring at 30 to 40° C. The mixture was further stirred to complete the coupling reaction and 32.8 parts of the disazo-compound represented by the following formula (26) were obtained.

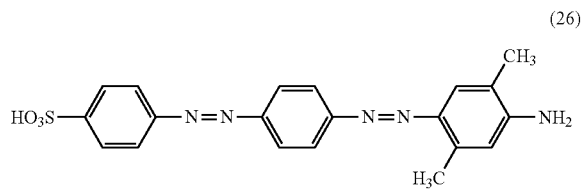 [SMILES: Cc1cc(N=Nc2ccc(N=Nc3ccc(S(=O)(=O)O)cc3)cc2)c(C)cc1N]

(26)

In 600 parts of water were dispersed 40 parts of the disazo compound of the above formula (26), and then thereto were added 32 parts of 35% aqueous hydrochloric acid and then 6.9 parts of sodium nitrite, followed by stirring at 25 to 30° C. for 2 hours to perform diazotization. Separately, 55 parts of the naphthol compound represented by the following formula (27) were added to 250 parts of a 20% pyridine aqueous solution and dissolved by making weakly alkaline with sodium carbonate. In this solution was introduced the diazotized product of the disazo compound obtained above with keeping the pH at 7 to 10, and the solution was stirred to complete the coupling reaction. Salting-out was carried out with sodium chloride and the precipitate was filtered to obtain 65 parts of the trisazo compound represented by the above formula (4). This compound had a reddish violet color and a maximum absorption wavelength at 574 nm in a 20% pyridine aqueous solution.

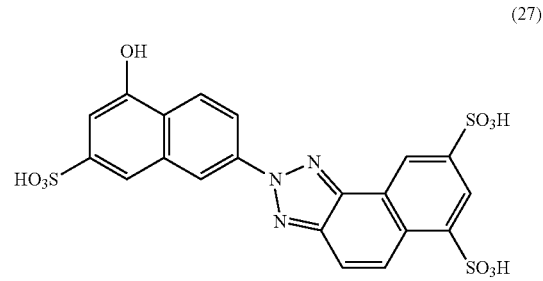 [SMILES: O=S(=O)(O)c1cc(O)c2ccc(-n3nc4ccc5c(S(=O)(=O)O)cc(S(=O)(=O)O)cc5c4n3)cc2c1]

(27)

Example 2

54 parts of the compound represented by the above formula (5) were obtained in the same manner as in Example 1, except that 2,5-dimethylaniline was replaced with 2-methoxy-5-methylaniline as the secondary coupler for the compound represented by the above formula (26) and that the naphthol compound was replaced with the compound represented by the following formula (28) as the third coupler. This compound had a reddish violet color and a maximum absorption wavelength at 576 nm in a 20% pyridine aqueous solution.

(28)

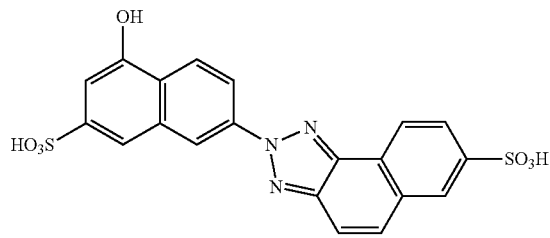

(29)

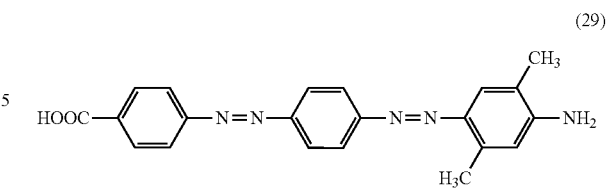

Example 3

9 parts of the compound represented by the above formula (5) were dissolved in 100 parts of water, and 2 parts of crystal copper sulfate and 1 part of monoethanolamine were added thereto and reacted at 95° C. for 10 hours. Subsequently, salting-out was carried out with sodium chloride and the precipitate was filtered to obtain 8 parts of the compound represented by the above formula (6). This compound had a maximum absorption wavelength at 619 nm in a 20% pyridine aqueous solution.

Example 4

55 parts of the naphthol compound represented by the above formula (27) were subjected to coupling in a 20% pyridine aqueous solution while 2,5-dimethylaniline was replaced with 2,5-dimethoxyaniline as the secondary coupler for the compound represented by the above formula (26). Subsequently, 2 parts of crystal copper sulfate and 1 part of monoethanolamine were added thereto and reacted at 95° C. for 10 hours and after that, salting-out was carried out with sodium chloride and the precipitate was filtered to obtain 8 parts of the compound represented by the above formula (7). This compound had a maximum absorption wavelength at 661 nm in a 20% pyridine aqueous solution.

Example 5

13.7 parts of 4-aminobenzoic acid were added to 500 parts of water and dissolved with sodium hydroxide. 32 parts of 35% aqueous hydrochloric acid were added thereto followed by addition of 6.9 parts of sodium nitrite and the mixture was stirred for one hour. 20.9 parts of aniline w-methanesulfonic acid soda were added thereto and pH was adjusted to 3 by adding sodium carbonate while stirring at 20 to 30° C. The mixture was further stirred to complete the coupling reaction and a monoazo-compound was obtained. This monoazo compound was stirred and hydrolyzed at 90° C. in a 2% sodium hydroxide aqueous solution to obtain a monoazo amino compound. 32 parts of 35% aqueous hydrochloric acid were added to the obtained monoazo amino compound and then 6.9 parts of sodium nitrite were added and the mixture was stirred for 1 hour. 12.1 parts of 2,5-dimethylaniline dissolved in dilute hydrochloric acid water were added thereto and pH was adjusted to 3 by adding sodium carbonate while stirring at 30 to 40° C. The mixture was further stirred to complete the coupling reaction and 18.9 parts of the disazo-compound represented by the following formula (29) were obtained.

In 600 parts of water were dispersed 37 parts of the disazo compound of the above formula (29), and then thereto were added 32 parts of 35% aqueous hydrochloric acid and then 6.9 parts of sodium nitrite, followed by stirring at 25 to 30° C. for 2 hours to perform diazotization. Separately, 55 parts of the naphthol compound represented by the above formula (28) were added to 250 parts of a 20% pyridine aqueous solution and dissolved by making weakly alkaline with sodium carbonate. In this solution was introduced the diazotized product of the disazo compound obtained above with keeping the pH at 7 to 10, and the solution was stirred to complete the coupling reaction. Salting-out was carried out with sodium chloride and the precipitate was filtered to obtain 62 parts of the trisazo compound represented by the above formula (8). This compound had a red color and a maximum absorption wavelength at 573 nm in a 20% pyridine aqueous solution.

Example 6

30 parts of 6-aminonaphthalene-1,3-disulfonic acid were added to 500 parts of water and dissolved with sodium hydroxide. 32 parts of 35% aqueous hydrochloric acid were added thereto followed by addition of 6.9 parts of sodium nitrite and the mixture was stirred for one hour. 10.7 parts of 3-methylaniline dissolved in dilute hydrochloric acid water were added thereto and pH was adjusted to 3 by adding sodium carbonate while stirring at 20 to 30° C. The mixture was further stirred to complete the coupling reaction and a monoazo-compound was obtained. 32 parts of 35% aqueous hydrochloric acid were added to this monoazo compound and then 6.9 parts of sodium nitrite were added and the mixture was stirred for one hour. 13.7 parts of 2-methoxy-5-methylaniline dissolved in dilute hydrochloric acid water were added thereto and pH was adjusted to 3 by adding sodium carbonate while stirring at 30 to 40° C. The mixture was further stirred to complete the coupling reaction and 32 parts of the disazo-compound represented by the following formula (30) were obtained.

(30)

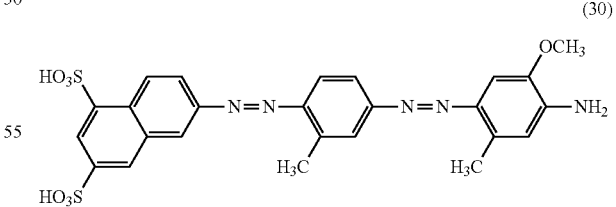

In 600 parts of water were dispersed 57 parts of the disazo compound of the above formula (30), and then thereto were added 32 parts of 35% aqueous hydrochloric acid and then 6.9 parts of sodium nitrite, followed by stirring at 25 to 30° C. for 2 hours to perform diazotization. Separately, 55 parts of the naphthol compound represented by the following formula (27) were added to 250 parts of a 20% pyridine aqueous solution and dissolved by making weakly alkaline with sodium carbonate. In this solution was introduced the diazotized product of the disazo compound obtained above with keeping the pH at 7 to 10, and the solution was stirred to complete the coupling reaction. Salting-out was carried out with sodium chloride and the precipitate was filtered to obtain 82 parts of the trisazo compound represented by the above formula (9). This compound had a maximum absorption wavelength at 590 nm in a 20% pyridine aqueous solution.

Example 7

11.3 parts of the compound represented by the above formula (9) were dissolved in 100 parts of water, and 2 parts of crystal copper sulfate and 1 part of monoethanolamine were added thereto and reacted at 95° C. for 10 hours. Subsequently, salting-out was carried out with sodium chloride and the precipitate was filtered to obtain 10 parts of the compound represented by the above formula (10). This compound had a maximum absorption wavelength at 619 nm in a 20% pyridine aqueous solution.

Example 8

33 parts of the compound represented by the above formula (11) were obtained in the same manner as in Example 6, except that 2-methoxy-5-methylaniline was replaced with 2,5-dimethoxyaniline as the secondary coupler for the compound represented by the above formula (30). This compound had a maximum absorption wavelength at 605 nm in a 20% pyridine aqueous solution.

Example 9

11.5 parts of the compound represented by the above formula (11) were dissolved in 100 parts of water, and 2 parts of crystal copper sulfate and 1 part of monoethanolamine were added thereto and reacted at 95° C. for 10 hours. Subsequently, salting-out was carried out with sodium chloride and the precipitate was filtered to obtain 10 parts of the compound represented by the above formula (12). This compound had a maximum absorption wavelength at 661 nm in a 20% pyridine aqueous solution.

Example 10

31 parts of the compound represented by the above formula (13) were obtained in the same manner as in Example 6, except that 3-methylaniline was replaced with 2,5-dimethylaniline as the primary coupler for the compound represented by the above formula (30). This compound had a maximum absorption wavelength at 598 nm in a 20% pyridine aqueous solution.

Example 11

10 parts of the compound represented by the above formula (14) were obtained in the same manner as in Example 9, except that the compound represented by the above formula (11) was replaced with the compound represented by the above formula (13). This compound had a maximum absorption wavelength at 660 nm in a 20% pyridine aqueous solution.

Example 12

31 parts of the compound represented by the above formula (15) were obtained in the same manner as in Example 6, except that 3-methylaniline was replaced with 2-methoxy-5-methylaniline as the primary coupler for the compound represented by the above formula (30). This compound had a maximum absorption wavelength at 605 nm in a 20% pyridine aqueous solution.

Example 13

11 parts of the compound represented by the above formula (16) were obtained in the same manner as in Example 9, except that the compound represented by the above formula (11) was replaced with the compound represented by the above formula (15). This compound had a maximum absorption wavelength at 670 nm in a 20% pyridine aqueous solution.

Example 14

33 parts of the compound represented by the above formula (17) were obtained in the same manner as in Example 6, except that 30 parts of 6-aminonaphthalene-1,3-disulfonic acid which was the starting material for the compound represented by the above formula (30) was replaced with 30 parts of 7-aminonaphthalene-1,3-disulfonic acid and that 2-methoxy-5-methylaniline was replaced with 2,5-dimethoxyaniline as the secondary coupler. This compound had a maximum absorption wavelength at 604 nm in a 20% pyridine aqueous solution.

Example 15

10 parts of the compound represented by the above formula (18) were obtained in the same manner as in Example 9, except that the compound represented by the above formula (11) was replaced with the compound represented by the above formula (17). This compound had a maximum absorption wavelength at 660 nm in a 20% pyridine aqueous solution.

Example 16

33 parts of the compound represented by the following formula (31) were obtained in the same manner as in Example 6, except that 30 parts of 6-aminonaphthalene-1,3-disulfonic acid which was the starting material for the compound represented by the above formula (30) was replaced with 30 parts of 7-aminonaphthalene-1,3-disulfonic acid, 3-methylaniline was replaced with 2-methoxy-5-methylaniline as the primary coupler and that 2-methoxy-5-methylaniline was replaced with 2,5-dimethoxyaniline as the secondary coupler. 11.5 parts of this compound were dissolved in 100 parts of water, and 2 parts of crystal copper sulfate and 1 part of monoethanolamine were added thereto and reacted at 95° C. for 10 hours. Subsequently, salting-out was carried out with sodium chloride and the precipitate was filtered to obtain 10 parts of the compound represented by the above formula (19). This compound had a maximum absorption wavelength at 661 nm in a 20% pyridine aqueous solution.

(31)

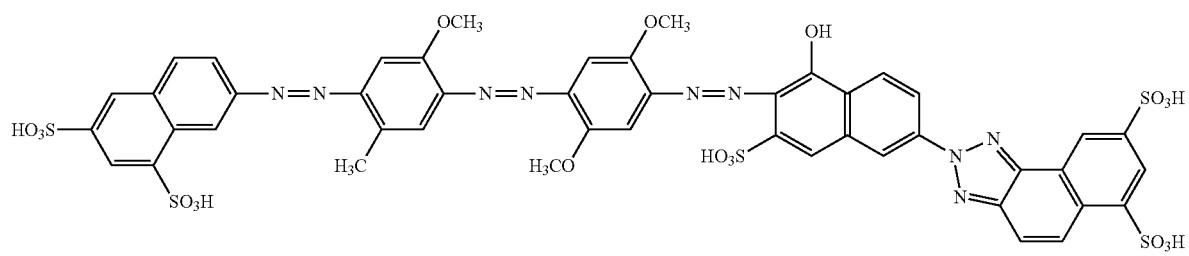

Example 17

26 parts of the compound represented by the above formula (20) were obtained in the same manner as in Example 5, except that the starting material for the compound represented by the above formula (29) was replaced with 2-amino-5-methoxybenzenesulphonic acid and that the primary and the secondary couplers were replaced with 2,5-dimethylaniline. This compound had a maximum absorption wavelength at 571 nm in a 20% pyridine aqueous solution.

Example 18

28 parts of the compound represented by the above formula (21) were obtained in the same manner as in Example 5, except that the starting material for the compound represented by the above formula (29) was replaced with 2-amino-5-sulfobenzoic acid, the primary coupler was replaced with 2,5-dimethylaniline, and the secondary coupler was replaced with 2-methoxy-5-methylaniline. This compound had a maximum absorption wavelength at 588 nm in a 20% pyridine aqueous solution.

Example 19

29 parts of the compound represented by the above formula (22) were obtained in the same manner as in Example 5, except that the starting material for the compound represented by the above formula (29) was replaced with 4-amino-3-methylbenzenesulphonic acid, the primary coupler was replaced with 2-methoxy-5-methylaniline, and the secondary coupler was replaced with 2,5-dimethylaniline. This compound had a maximum absorption wavelength at 577 nm in a 20% pyridine aqueous solution.

Example 20

15 parts of the compound represented by the above formula (23) were obtained in the same manner as in Example 5, except that the starting material for the compound represented by the above formula (29) was replaced with 4-(4-aminobenzoyl)aminobenzenesulfonic acid and the primary coupler was replaced with 3-methylaniline. This compound had a maximum absorption wavelength at 551 nm in a 20% pyridine aqueous solution.

Example 21

20 parts of the compound represented by the above formula (25) were obtained in the same manner as in Example 5, except that the starting material for the compound represented by the above formula (29) was replaced with 2-amino-5-methylbenzenesulphonic acid and the primary coupler was replaced with 3,5-dimethylaniline. This compound had a maximum absorption wavelength at 546 nm in a 20% pyridine aqueous solution.

Example 22

A polyvinyl alcohol film of 75 μm in thickness was dipped in an aqueous solution containing the compound of the above formula (4) obtained in Example 1 in a concentration of 0.03% and sodium sulfate in a concentration of 0.1% at 45° C. for 4 minutes. This film was stretched fivefold in a 3% aqueous boric acid solution at 50° C., and washed with water and dried with keeping the stretched state to obtain a polarizing film.

The (a) maximum absorption wavelength of the obtained polarizing film was 558 nm; and (b) polarization coefficient was 99.9%. In addition, (C) light resistance (change in the polarization coefficient before and after irradiation) was 0.013%. That is, it has been found that the film was superior to Comparative Example 1 shown below even in the light resistance when exposed to light for a long time. In addition, long-term durability was shown in a condition which is both in high temperature and high humidity. The test methods for the above characteristics (a) to (c) are described below.
(a) Measurement of Maximum Absorption Wavelength (λ max) of Polarizing Film Two pieces of the polarizing films obtained above were superposed one upon another so that the orientation directions are perpendicular to each other (perpendicular position), and in this state the maximum absorption wavelength was measured using a spectrophotometer (U-4100 manufactured by Hitachi, Ltd.).
(b) Measurement of Polarization Coefficient Transmittance at the parallel (Tp) and transmittance at the perpendicular position (Tc) were measured using the above spectrophotometer. The polarization coefficient was calculated by the formula: Polarization coefficient=[(Tp−Tc)/(Tp+Tc)]½×100(%).
(c) Light Resistance (Change in Polarization Coefficient Before and After Irradiation)

The polarizing film was irradiated with light for 532 hours using an accelerated xenon arc fade meter (manufactured by Wacom Co., Ltd.), and the polarization coefficient after irradiation was obtained by the method described in the above (b), and the change in the polarization coefficient before and after irradiation was calculated by the formula: Change in polarization coefficient before and after irradiation=(polarization coefficient before irradiation−polarization coefficient after irradiation)/polarization coefficient before irradiation×100(%).

Comparative Example 1

A polarizing film was prepared in the same manner as in Example 22, except that the compound of the structure of the following formula (32) described in Example 1 of Patent Document 1 was used in place of the compound of the above formula (4) obtained in Example 1. The polarizing film was irradiated with light for 532 hours using an accelerated xenon arc fade meter manufactured by Wacom Co., Ltd. Change in polarization coefficient before and after irradiation of light was 0.027%, which corresponded to light resistance not higher than ½ of the polarizing film of Example 22.

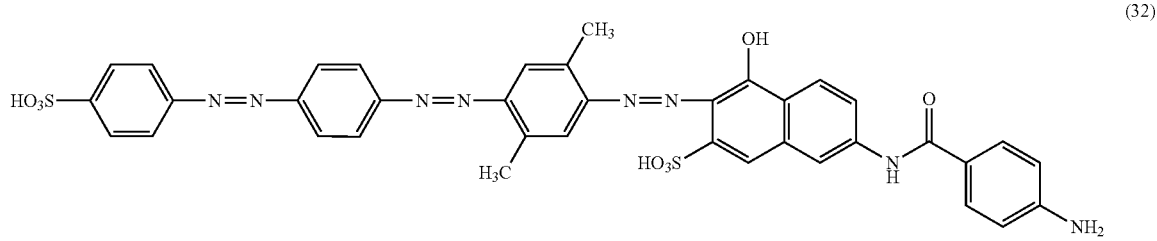 [SMILES: Cc1cc(N=Nc2c(S(=O)(=O)O)cc3cc(NC(=O)c4ccc(N)cc4)ccc3c2O)c(C)cc1N=Nc1ccc(N=Nc2ccc(S(=O)(=O)O)cc2)cc1]

(32)

Example 23

Polarizing films were obtained in the same manner as in Example 22 except that the azo compounds of the above formulas (5) to (23) and (25) were used in place of the compound of the above formula (4). The maximum absorption wavelength and the polarization coefficient of the obtained polarizing films are shown in Table 1. The polarizing film prepared with these compounds had high polarization coefficient as shown in Table 1.

TABLE 1

| Salt of azo compound | Maximum absorption wavelength (nm) | Polarization coefficient |
|---|---|---|
| Compound of the above Formula (5) | 577 | 99.9% |
| Compound of the above Formula (6) | 614 | 99.9% |
| Compound of the above Formula (7) | 662 | 99.9% |
| Compound of the above Formula (8) | 559 | 99.9% |
| Compound of the above Formula (9) | 582 | 99.9% |
| Compound of the above Formula (10) | 620 | 99.9% |
| Compound of the above Formula (11) | 607 | 99.9% |
| Compound of the above Formula (12) | 663 | 99.9% |
| Compound of the above Formula (13) | 613 | 99.9% |
| Compound of the above Formula (14) | 665 | 99.9% |
| Compound of the above Formula (15) | 610 | 99.9% |
| Compound of the above Formula (16) | 675 | 99.9% |
| Compound of the above Formula (17) | 609 | 99.9% |
| Compound of the above Formula (18) | 663 | 99.9% |
| Compound of the above Formula (19) | 674 | 99.9% |
| Compound of the above Formula (20) | 565 | 99.9% |
| Compound of the above Formula (21) | 584 | 99.9% |
| Compound of the above Formula (22) | 577 | 99.9% |
| Compound of the above Formula (23) | 537 | 99.9% |
| Compound of the above Formula (25) | 538 | 99.9% |

Example 24

A polyvinyl alcohol film of 75 μm in thickness was dipped in an aqueous solution containing the compound of the above formula (10) obtained in Example 7 in a concentration of 0.1%, C.I. Direct Red 81 in a concentration of 0.02%, C.I. Direct Orange 39 in a concentration of 0.02%, a compound represented by the structure of the following formula (33) disclosed in Example 2 of Patent Document 3 in a concentration of 0.02% and sodium sulfate in a concentration of 0.1% at 45° C. for 4 minutes. This film was stretched fivefold in a 3% aqueous boric acid solution at 50° C., and washed with water and dried with keeping the stretched state to obtain a polarizing film of neutral color (grey at the parallel position and black at the perpendicular position). The resulting polarizing film had a single plate average light transmittance of 41% and an average light transmittance at the perpendicular position of 0.1% or lower, and had a high polarization degree. Furthermore, it had durability for a long period of time even under the conditions of high temperature and high humidity.

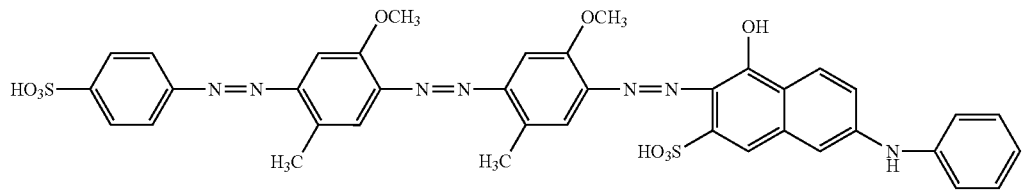

(33)

Example 25

A polyvinyl alcohol film of 75 μm in thickness was dipped in an aqueous solution containing the compound of the above formula (10) obtained in Example 7 in a concentration of 0.1%, a compound represented by the structure of the following formula (34) disclosed in Example 1 of Patent Document 4 in a concentration of 0.01% at 48° C. for 6.5 minutes. This film was stretched fivefold in a 3% aqueous boric acid solution at 50° C., and washed with water and dried with keeping the stretched state to obtain a polarizing film. The resulting polarizing film had a maximum absorption wavelength (λ max) at 610 nm, a single plate average light transmittance at 600 to 640 nm of 42.15% and an average light transmittance at the perpendicular position of 0.009% or lower, and had a high polarization degree. A TAC film (thickness: 80 μm, trade name: TD-80U manufactured by Fuji Photo Film Co., Ltd.) was adhered on one surface of the resulting polarizing film with a polyvinyl alcohol adhesive, and the TAC film having a UV (ultraviolet ray) curing hard coat layer of about 10 μm in thickness formed on side thereof was adhered on another surface of the resulting polarizing film with a PVA adhesive to obtain a dye-containing polarizing plate of the present invention. An acrylic ester pressure sensitive adhesive was adhered to one side of the polarizing plate to obtain a polarizing plate with a pressure sensitive adhesive layer. Furthermore the outer side of the hard coat layer was subjected to AR (anti-reflection) multi-coating treatment by vacuum deposition. This polarizing plate was cut to a size of 30 mm×40 mm and adhered on a transparent glass plate of the same size having an AR layer on one side to obtain a color polarizing plate with an AR support (for red color channel) for a liquid crystal projector of the present invention. The color polarizing plate of this Example for a liquid crystal projector had a high polarization coefficient and showed durability over a long period of time even under the conditions of high temperature and high humidity. Furthermore, also, resistance to prolonged irradiation of light was excellent.

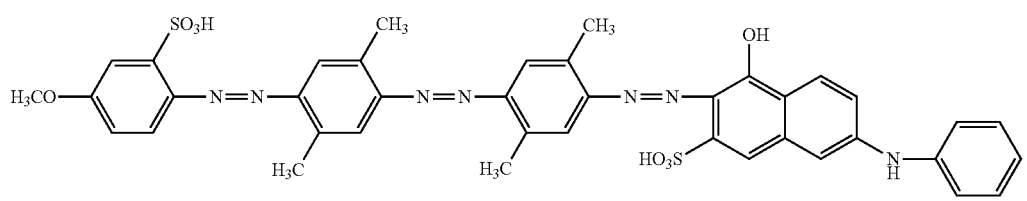

(34)

Comparative Example 2

A polarizing film was prepared in the same manner as in Example 25 except that an aqueous solution of 48° C. was used in which the compound of the above formula (10) was replaced with the compound shown as Compound No. 2 disclosed in Patent Document 2 in a concentration of 0.1% and the compound represented by the following formula (35) in a concentration of 0.02%. The resulting polarizing film had a maximum absorption wavelength (λ max) at 600 nm, a single plate average light transmittance at 600 to 640 nm of 41.76% and an average light transmittance at the perpendicular position of 0.012%, and the film was inferior in performance both in contrast and brightness to the film of Example 25.

(35)

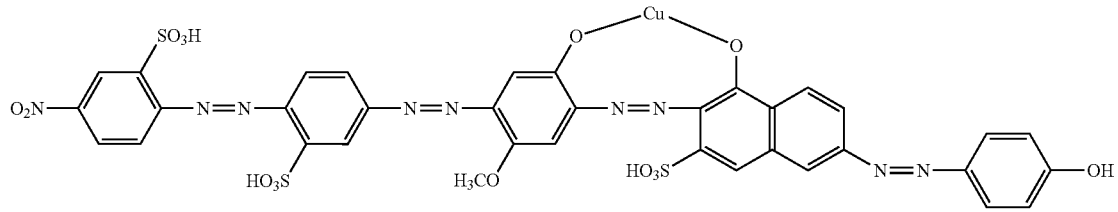

Example 26

A polarizing film was prepared in the same manner as in Example 25 except that an aqueous solution of 45° C. containing the compound (4) obtained in Example 1 in a concentration of 0.1%, C.I. Direct Orange in a concentration of 0.2% 39 and sodium sulfate in a concentration of 0.1% was used. The resulting polarizing film had a maximum absorption wavelength at 555 nm, a single plate average light transmittance in 530 to 570 nm of 42% and an average light transmittance at the perpendicular position of 0.01% or lower, and the film had a high polarization coefficient. This polarizing film was adhered in the same manner as in Example 25 to obtain a color polarizing plate with an AR support (for green color channel) for a liquid crystal projector of the present invention. The polarizing plate of this Example had a high polarization coefficient and showed durability over a long period of time even under the conditions of high temperature and high humidity. Furthermore, also, resistance to prolonged irradiation of light was excellent.

Industrial Applicability

The azo compound of the present invention or a salt thereof is useful as a dye for polarizing films. The polarizing films containing the compound are suitable for various liquid crystal display devices and liquid crystal projectors, specifically, uses in vehicles and display uses of industrial instruments used in various environments.

The invention claimed is:

1. An azo compound represented by the following formula (1):

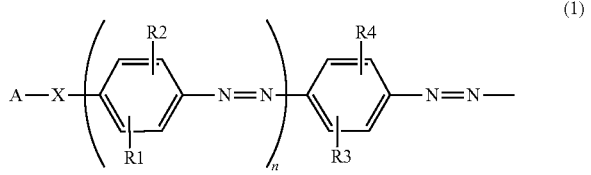

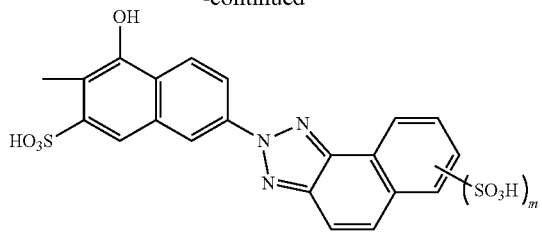

wherein A represents a naphthyl group having 1 to 3 sulfonic acid groups and X represents —N═N— or —NHCO—; R1 to R4 each independently represent a hydrogen atom, a lower alkyl group or a lower alkoxyl group; m=1 to 3; and n=1, or a salt thereof.

2. The azo compound or a salt thereof according to claim 1 wherein A is a naphthyl group having one or two sulfonic acid groups.

3. The azo compound or a salt thereof according to claim 1 wherein R1 to R4 are each independently a hydrogen atom, a lower alkyl group or a lower alkoxyl group.

4. A dye-containing polarizing film comprising one or more azo compounds and/or salts thereof according to claim 1 in a polarizing film base material.

5. A dye-containing polarizing film comprising one or more azo compounds and/or salts thereof according to claim 1 and one or more other organic dyes in a polarizing film base material.

6. A dye-containing polarizing film comprising two or more azo compounds and/or a salt thereof according to claim 1 and one or more other organic dyes in a polarizing film base material.

7. The dye-containing polarizing film according to any one of claims 4 to 6 wherein the polarizing film base material is a film comprising a polyvinyl alcohol resin.

8. A dye-containing polarizing plate formed by adhering a transparent protective film to at least one surface of a dye-containing polarizing film according to any one of claims 4 to 6.

9. A polarizing plate for a liquid crystal display comprising a dye-containing polarizing film or a dye-containing polarizing plate according to any one of claims 4 to 6.

10. A color polarizing plate for a liquid crystal projector comprising a dye-containing polarizing film or a dye-containing polarizing plate according to any one of claims 4 to 6.

* * * * *